United States Patent

Bergman et al.

[11] Patent Number: 6,043,777
[45] Date of Patent: Mar. 28, 2000

[54] METHOD AND APPARATUS FOR GLOBAL POSITIONING SYSTEM BASED COOPERATIVE LOCATION SYSTEM

[75] Inventors: Julian J. Bergman, Littleton, Colo.; Scott W. Kennett, Jordan; John D. Roths, Draper, both of Utah; Karl L. Thorup, Taylorsville, Utah

[73] Assignee: Raytheon Aircraft Company, Salt Lake City, Utah

[21] Appl. No.: 08/872,257

[22] Filed: Jun. 10, 1997

[51] Int. Cl.[7] ................................................ G01S 3/05
[52] U.S. Cl. ............................ 342/357.09; 342/357.08
[58] Field of Search ........................... 342/357, 357.07, 342/357.08, 357.09, 386; 701/213

[56] References Cited

U.S. PATENT DOCUMENTS

| | | | |
|---|---|---|---|
| 5,334,986 | 8/1994 | Fernhout | 342/357 |
| 5,344,105 | 9/1994 | Youhanaie | 244/3.14 |
| 5,364,093 | 11/1994 | Huston et al. | 273/32 R |
| 5,389,934 | 2/1995 | Kass | 342/357 |
| 5,394,333 | 2/1995 | Kao | 342/357 |
| 5,487,009 | 1/1996 | Hill | 342/357 |
| 5,488,559 | 1/1996 | Seymour | 342/357 |
| 5,502,446 | 3/1996 | Denninger . | |
| 5,554,994 | 9/1996 | Schneider | 342/357 |
| 5,589,835 | 12/1996 | Gildea et al. | 342/357 |
| 5,689,269 | 11/1997 | Norris | 342/357 |
| 5,702,070 | 12/1997 | Waid | 342/359 |
| 5,731,786 | 3/1998 | Abraham et al. | 342/357 |
| 5,739,785 | 4/1998 | Allison et al. | 342/357 |
| 5,752,218 | 5/1998 | Harrison et al. | 701/213 |
| 5,781,150 | 7/1998 | Norris | 342/357 |

FOREIGN PATENT DOCUMENTS

| | | |
|---|---|---|
| 0574009 | 12/1993 | European Pat. Off. . |
| 2735872 | 12/1996 | France . |
| WO 96/07110 | 3/1996 | WIPO . |
| WO 96/14558 | 5/1996 | WIPO . |

OTHER PUBLICATIONS

International Search Report dated Oct. 19, 1998 (PCT/US98/11985)(RAYT:006P).

*Primary Examiner*—Gregory C. Issing
*Attorney, Agent, or Firm*—Arnold White & Durkee

[57] ABSTRACT

A cooperative location system for use with a Global Positioning System ("GPS"). The system includes a beacon that receives GPS signals and transmits GPS data representing the location of the beacon to a remote locator. The locator receives the beacon's GPS data from the beacon. Based on the beacon's GPS data, a reference direction provided by a compass, and the locator's own GPS data, the locator calculates range and direction information to the beacon.

19 Claims, 8 Drawing Sheets

METHOD AND APPARATUS FOR GLOBAL POSITIONING SYSTEM BASED COOPERATIVE LOCATION SYSTEM

BACKGROUND OF THE INVENTION

1. Field of the Invention

The present invention relates to a location system for locating a cooperative beacon. More particularly, it concerns a location system based on Global Positioning System ("GPS") technology that permits accurate range and direction detection of a cooperative beacon using relative GPS ("RGPS") differential range and direction.

2. Description of Related Art

The Global Positioning System ("GPS") presently consists of a constellation of 24 satellites that continuously broadcast time and frequency data on two frequencies, L1 and L2. GPS receivers have been developed that can determine a precise location on the earth by measuring the time required for the signals of three, or preferably four or more, of the satellites to reach the location on earth. Using these measurements and triangulating, the GPS receiver's position may be calculated. The GPS receiver provides position information in the form of X, Y, and Z axes coordinates measured in meters from the center of the earth. The position information is provided using 9 significant digits (e.g., 4137958.36).

GPS provides both a commercial version of GPS data and secure versions of GPS data. The secure versions of the GPS data requires the use of classified codes provided by the United States Government to decode the data. The commercial version of GPS data, referred to as C/A ("Coarse Acquisition") code GPS, uses only the L1 frequency and does not require any decoding. However, the United States Government imposes pseudo-random errors (referred to as selective availability ("S/A") random errors) into the location data provided by the satellites. Therefore, due to this introduced error, existing C/A code GPS based navigation aids provide a low resolution direction to a fixed point on the earth, i.e. a waypoint, with only an approximation range to the desired location. The Department of Defense controls the S/A random errors and determines the true accuracy of C/A commercial user GPS. The accuracy is nominally set to 300 meters spherical (3 d RMS) or 100 meters horizontal (2 d RMS). The classified version requiring code settings (Y-code) is much more accurate (on the order of 16 meters).

Alternatively, prior art locator systems using C/A mode GPS provide more accuracy by using differential GPS ("DGPS") techniques. These existing C/A mode DGPS based systems require a surveyed base site capable of calculating the introduced error from the C/A mode GPS data. The surveyed base site transmits the calculated error information to the locator. From its own C/A mode GPS data and the calculated error transmitted from the surveyed base site, the locator can correct for any introduced S/A error.

Existing GPS based locator systems further define their bearing information based on movement along a baseline. Until the user moves, however, there is no way for the user to determine the direction that they are going because GPS provides only an instantaneous position. Therefore, two subsequent positions are required to define direction.

Thus, a need has arisen for a system capable of accurately locating a beacon from a locator without using any external aids or surveys. In addition, a need has arisen for a locator in which no motion is required to determine range or bearing information. Further, a need has arisen for a cooperative location system operating at low (truncated) data rates in order to permit efficient transmission of information between a beacon and a locator.

SUMMARY OF THE INVENTION

The invention is a method and apparatus for providing the accurate direction and range from a locator to a cooperative beacon by using GPS positions at both the beacon and locator, with a data links between the units. This invention substantially eliminates or reduces the disadvantages and problems associated with previously developed location systems.

For example, in one embodiment of the invention, a beacon is positioned at a first point on the earth and a locator is positioned at a second point on the earth. The beacon comprises a GPS receiver for receiving GPS data representing the first point on the earth. The beacon also includes a transmitter for transmitting this data representing the first point on the earth to the locator. The locator includes a receiver operable to receive the beacon's first set of GPS data representing the location of the beacon. The locator also includes a GPS receiver for receiving a second set of data representing the location of the locator. In order to provide a reference direction for the locator, a compass is included with the locator. Finally, the locator includes a processor for calculating range in direction information to the beacon based on the first set of GPS data, second set of GPS data, and the referenced direction provided by the compass. By providing a reference direction, no movement is required to determine bearing or range information.

The invention is preferably implemented using RF at low band VHF. The use of RF at low band VHF provides some degree of terrain following to reduce the dependence on line of sight transmissions, such as microwave or light waves, which can either be blocked by foliage or other obstructions.

In another embodiment of the invention, the beacon transmits truncated data to the locator. This truncated data is formed by retaining the least significant digits of the GPS data that are lower in order than the most significant digits of two times a specified maximum range of operation around the beacon. By truncating the data, the present invention significantly reduces the amount of data that must be transmitted from the beacon to the locator.

According to another embodiment of the invention, a method is provided for determining the location and direction of a beacon by a locator. The locator receives a first set of GPS data representing the beacon's location on the earth. The locator also receives a second set of GPS data representing its location on the earth. Next, a reference direction is provided and the locator calculates the range and direction information of the beacon from the first and second sets of GPS data and the reference direction. Preferably, the first set of GPS data representing the location of a beacon is truncated data.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
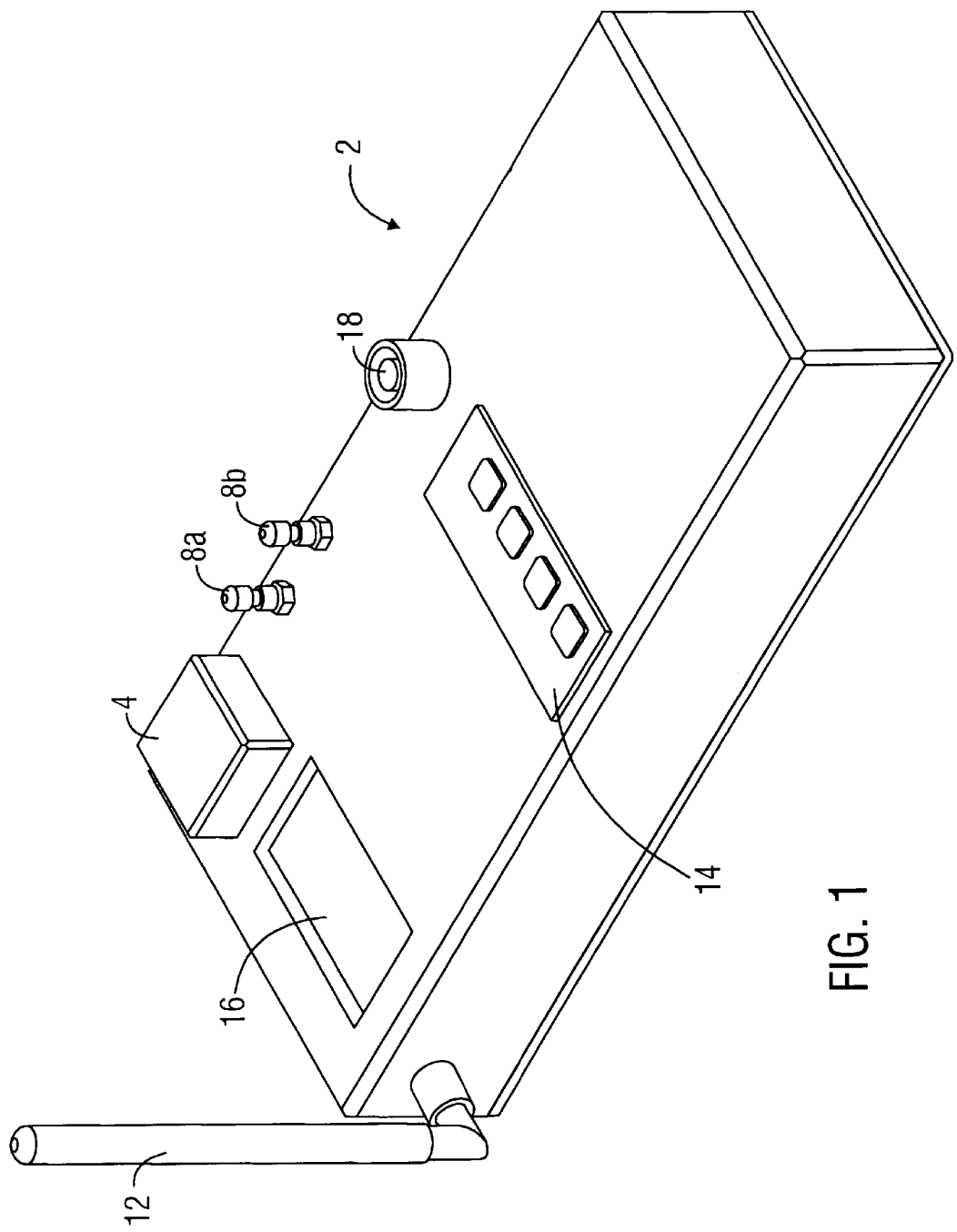
FIG. 1 is an exemplary embodiment of a beacon of the present invention.

The invention encompasses using GPS and an electronic magnetic compass for relative navigation (RGPS) without external aids or site surveys. It also includes a method of performing RGPS at very low (truncated) data rates.

The invention is designed, and has been operationally demonstrated, to be comprised of one or more beacons, and one or more locators that in concert provide the locator both the range and direction to the cooperative beacons on a given data transmission channel. In operation, a beacon determines its GPS position and the identification of the satellites that were used in the calculation, and compresses and transmits that data over a non-line of sight RF data link to the locator. A locator independently determines its GPS position and the satellites used in the position calculation, and compares that data to the received beacon position and satellite identification. The difference between the beacon and locator position data provides sufficiently accurate range and bearing information at long ranges (from several kilometers down to tenths of kilometers) despite S/A random errors. At short ranges (within tenths of a kilometer), S/A random errors may affect the accuracy of the system. However, by taking the difference of the recent position data of the beacon and locator, the effect of the S/A induced position errors are canceled out when using the same set of satellites. Further, by comparing its satellite identification information with the satellite identification numbers sent by the beacon, the locator can indicate a "Good" solution when the same set of satellites is being used for both sets of calculations, and therefore the most accuracy is expected. Otherwise, the locator can indicate that a different set of satellites has been used and the solution is "Bad," i.e., the S/A induced errors for the different sets of satellites affects the locators range and bearing information.

Using the difference between the beacon and locator positions provides the range between the two units and an absolute bearing in space. By using the north reference from the electronic compass built into each locator, the absolute pointing angle can be referenced to the local pointing angel at each operating unit, showing each operator the direction that they need to go to reach the beacon. This accurate dual range and bearing presentation permits an operator to assess when and how obstacles can be effectively skirted when attempting to locate a beacon.

In addition, different beacons can be operated simultaneously on different channels. Each locator can be tuned to the particular channel that corresponds to the beacon at a first or second destination. Once that position is located, the locator can be set to a new channel, and the process repeated for the new location (see FIG. 9).

The following examples are included to demonstrate exemplary embodiments of the invention. Exemplary embodiments of the present invention are illustrated with like numerals being used to refer to like and corresponding parts of the various drawings. It should be appreciated by those of skill in the art that the techniques disclosed in the examples which follow represent techniques discovered by the inventors to function well in the practice of the invention. However, those of skill in the art should, in light of the present disclosure, appreciate that many changes can be made in the specific embodiments which are disclosed and still obtain a like or similar result without departing from the spirit and scope of the invention.

In addition, the present invention is illustrated with examples demonstrating the usage of the cooperative location system on land. It should be understood, however, that the present invention could be used for air or sea based operations. In fact, airborne and seaborne usage present less stringent requirements than land based operation of one embodiment of the invention since airborne usage during level flight does not randomly occult satellites in a constellation and seaborne usage does not need to account for large changes in elevation from the baseline to field operation.

FIG. 1 is an exemplary embodiment of a beacon according to the present invention. The beacon 2 includes a GPS antenna 4 and GPS receiver 6 (see FIG. 2) for receiving GPS signals representing the location of the beacon 2. From these GPS signals, the beacon 2 derives its GPS data, including its position data and the identification of the satellites used to determine this data. Within the beacon 2, a data transmitter 10 (see FIG. 2) sends this GPS data via antenna 12 to an external locator. In an exemplary embodiment, data is transmitted between the beacon and locator using VHF RF transmission. Prior to transmission, the data is modulated using BPSK modulation. Further, the data may be encoded using any available coding techniques such as PN coding. It should be understood, however, that the modulation and encoding of data prior to transmission is not limited to the methods disclosed in the specification. Alternative methods of modulation and encoding can be used without departing from the spirit and scope of the invention as defined in the claims.

A keypad 14 permits entry of commands to the beacon 2. An LCD display 16 provides status information concerning the beacon 2. In an exemplary embodiment, the display 16 provides information such as the beacon's GPS position data and satellite identification information. Further, the display 16 may also display the radio frequency or channel that the beacon uses to transmit data to a locator.

The beacon 2 is turned on and off by power switch 18. In an embodiment of the invention, power control terminals 8a and 8b are provided to allow the beacon 2 to be placed into a "sleep" mode. The terminals may be connected via a wire to prevent current from flowing to the internal components of the beacon 2, thereby saving battery power. Once the wire is disconnected, as by the deployment of a parachute or other means, current may flow from the beacon's battery 20 to its internal components.

Figure 2:
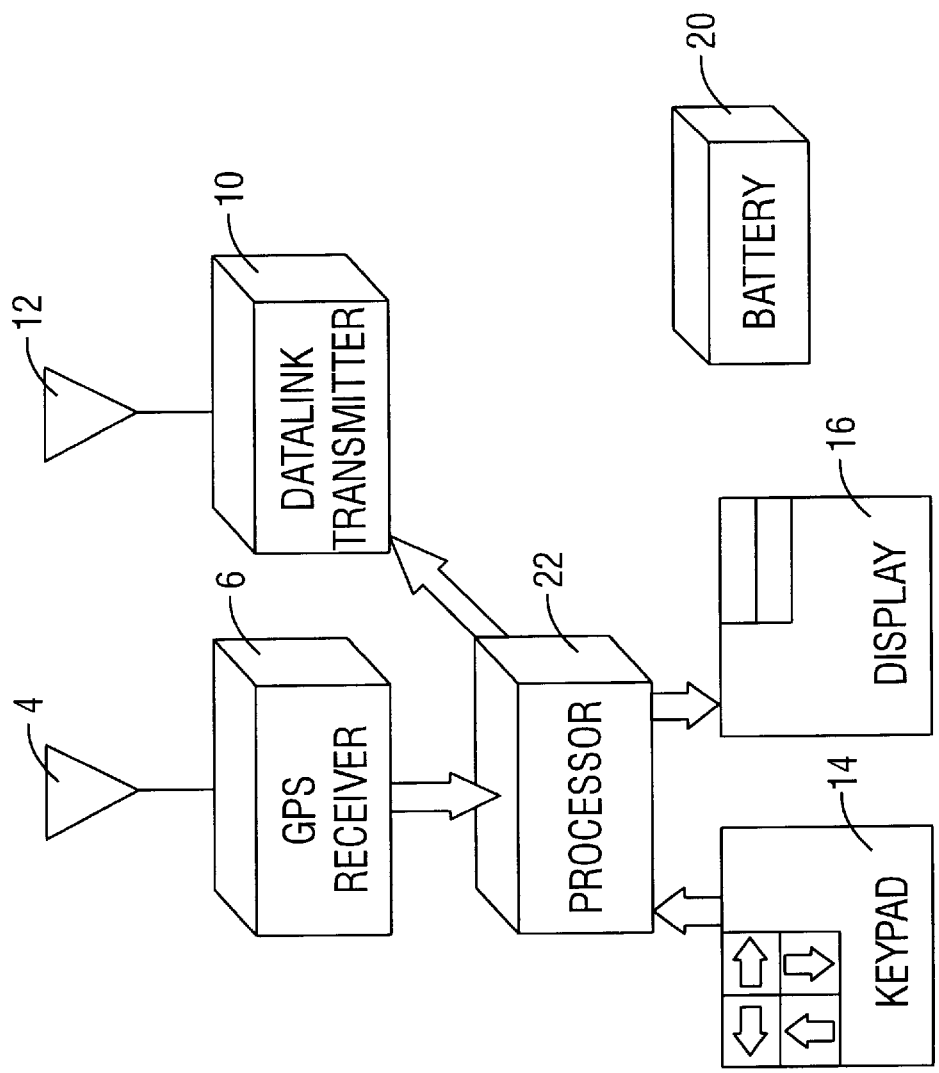
FIG. 2 is a functional diagram of an exemplary beacon of the present invention.

FIG. 2 depicts a functional block diagram of an exemplary beacon 2. GPS signals are received at a GPS receiver 6 via an antenna 4. The GPS receiver 6 passes the GPS data, including its GPS position and satellite identification information, to a processor 22. Processor 22 includes a keypad 14 for an operator to enter data and control operation of the beacon 2. A display 16 is included to provide status and location information to the operator. The processor 22 communicates with a datalink transmitter 10 for transmitting GPS data via antenna 12 to a remote locator. The beacon includes a battery 20 to supply the power to operate the beacon. The battery 20 may be a lithium-type battery or any other suitable battery.

Figure 3:
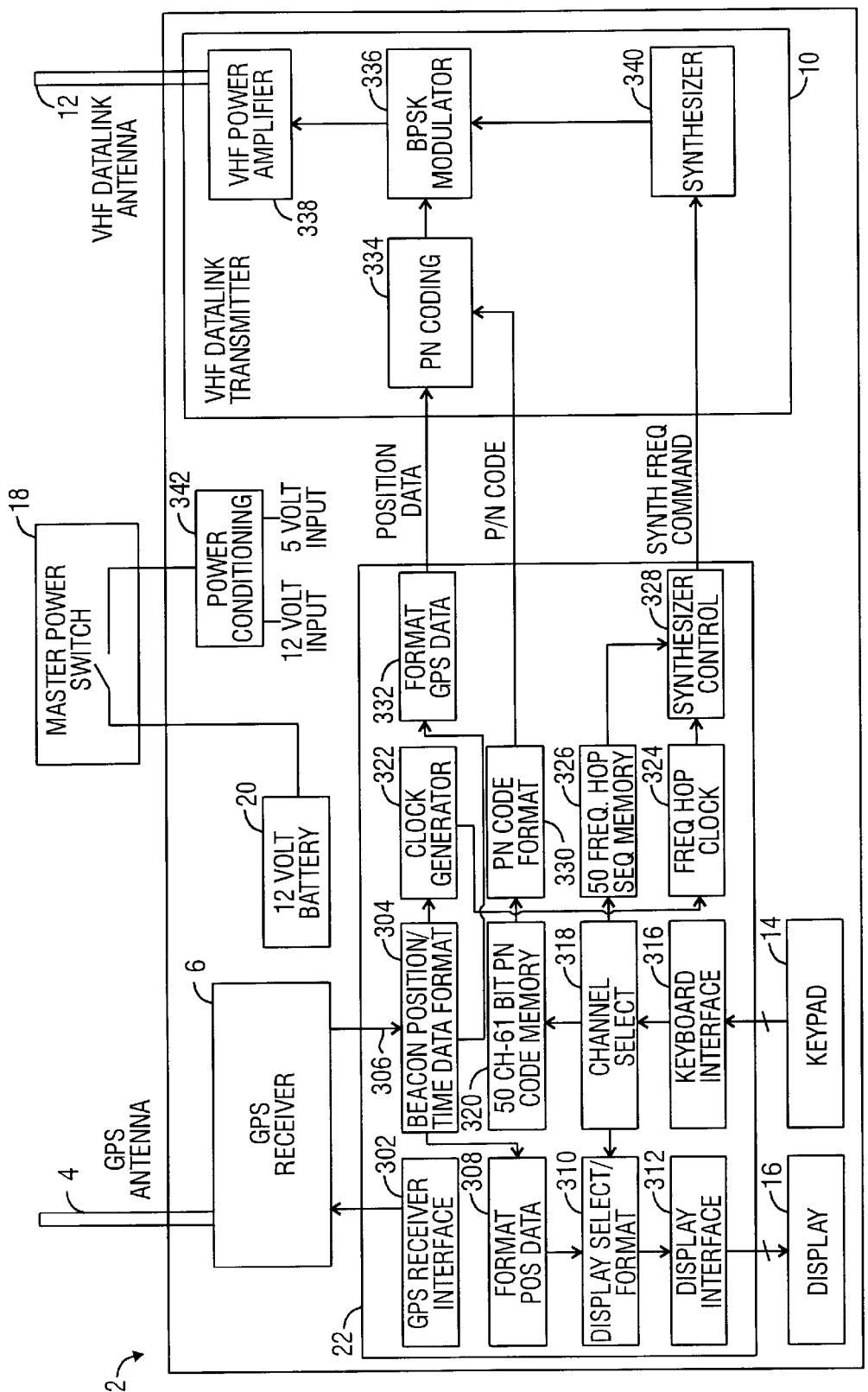
FIG. 3 is a block diagram of an exemplary beacon of the present invention.

FIG. 3 is a block diagram of an exemplary beacon of the present invention. GPS signals are received at a GPS receiver 6 via an antenna 4. The beacon 2 then derives its GPS position data and satellite identification information and transmits the data to a locator. In this exemplary embodiment, data is transmitted using standard spread spectrum techniques and frequency hopping techniques well-known in the art. However, it should be understood that transmission can be performed using any well known transmission and coding techniques. For additional security from eavesdropping, data may be encrypted prior to transmission using standard encryption algorithms. Truncating the data also adds a degree of security since an unauthorized receiver outside the intended range of the device will be unable to properly reconstruct the true location of the beacon.

The GPS receiver 6 interfaces to the processor 22 through a GPS receiver interface 302. The GPS receiver 6 provides the processor 22 with GPS data in ASCII format. The GPS data is transferred to the Beacon Position/Time Data Format Module 304 of the processor 22 by an RS-232 or RS-422 connection 306. From this data, the processor 22 formats the GPS data in modules 308 and 310 and displays the data through a display interface 312 of processor 22 on display 16. The display format is selected by an operator at the keypad 14.

The keypad 14 also permits an operator to control other operations of the beacon 2. Commands entered at keypad 14 are provided to the processor 22 through a keyboard interface 316. For example, an operator can enter the channel that the beacon 2 will transmit on. This information is received by the processor 22 through keyboard interface 316 and passed on to a channel select module 318 of the processor 22. The channel select module 318 passes this information on to the display/select format module 310. Thus, the channel select information can be displayed at display 16 through the display interface 312.

The channel select module 318 also provides the channel information to a 50 channel PN (pseudo-random number) code memory 320. The PN code corresponding to the selected channel is placed in PN code format in module 330 and provided to the datalink transmitter 10. An exemplary embodiment provides for 50 channels for the beacon 2 to transmit on. The corresponding locator must be programmed to the same channel in order to receive the beacon's transmitted data.

The channel select module 318 may also provide the channel select information to a frequency hopping sequential memory 326. Once again, an exemplary embodiment provides for a 50 frequency hopping sequential memory. The processor includes a synthesizer control 328 for controlling the frequency synthesizer 340. The synthesizer control 328 receives a signal from the frequency hop clock 324 and the frequency hop memory 326. From these signals the synthesizer control 328 controls the frequency the synthesizer 340 transmits on. Once again, the locator must be synchronized with the beacon in order to receive the beacon's transmitted position data during frequency hopping.

To maintain synchronization during frequency hopping, a clock generator 322 receives time data from the GPS receiver 6. As described below, the locator also receives time data from its GPS receiver. Based on this information, the beacon and locator can remain synchronized during frequency hopping.

It should be understood that use of frequency hopping is merely exemplary. The present invention can be operated using only PN coding without using frequency hopping techniques. In an embodiment of the invention using only PN coding, channel select module 318 indicates the single frequency to transmit on. Subsequently, synthesizer control 328 controls the transmit frequency of the synthesizer 340.

The processor 22 of the present invention provides the following data to data transmitter 10: the GPS data, a PN code, and a Synth Freq Command, which controls the frequency of the synthesizer. The GPS data is formatted by the processor 22 in the Format GPS Data Module 332. In PN Coding Modules 334, the position data is encoded using standard PN coding techniques. The data is modulated at the BPSK modulator 336 at the frequency controlled by the synthesizer 340. The modulated data is amplified by VHF power amplifier 338 and transmitted via VHF Datalink antenna 12.

Power is supplied to the beacon by a 12-volt battery 20. Master power switch 18 controls when power is supplied to the beacon 2. Prior to supplying power to the beacon 2, the output of the 12-volt battery 20 is supplied to a power conditioning circuit 342 in order to provide a 12-volt and 5-volt input to the internal components of the beacon 2.

Figure 4:
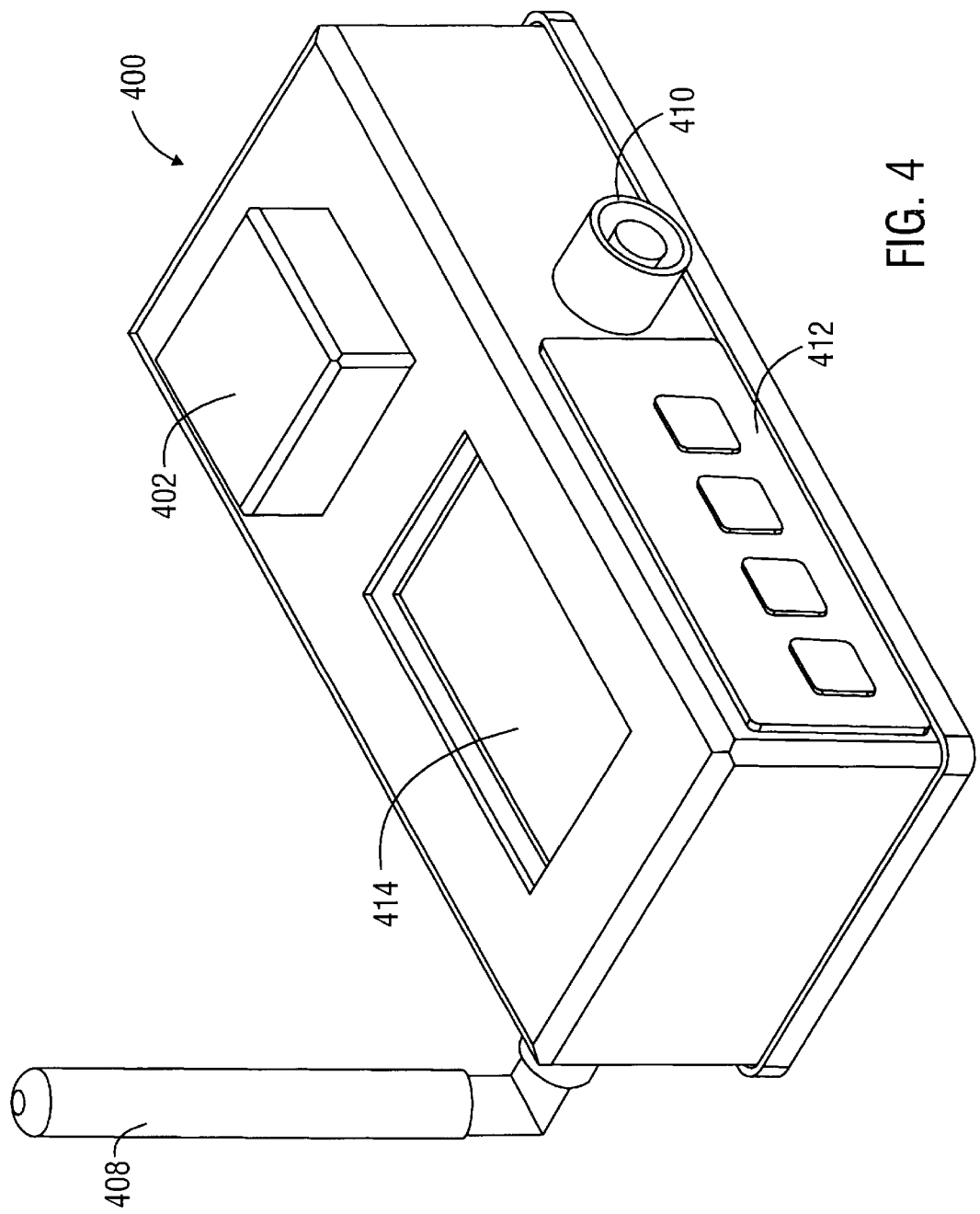
FIG. 4 is an exemplary embodiment of a locator of the present invention.

FIG. 4 is a physical layout of an exemplary locator according to the present invention. The locator 400 includes a GPS antenna 402 and a GPS receiver 404 (shown in FIG. 5) for receiving GPS signals representing the position of the locator 400. From these GPS signals, the locator 400 derives its GPS data, including its position data and the identification of the satellites used to determine this position. An antenna 408 is also provided for receiving GPS data transmitted from a remote beacon. In an exemplary embodiment, data is transmitted between the beacon and locator using RF transmission at VHF frequencies. The use of RF at low band VHF provides some degree of terrain following to reduce the dependence on line of sight transmissions like microwaves or light waves (including IR) that can easily be blocked by foliage or other obstructions. It should be understood, however, that alternative methods of transmission can be used without departing from the spirit and scope of the invention as defined in the claims. Power switch 410 turns the locator 400 on and off.

The locator 400 further includes a keypad 412 that permits entry of commands to the locator 400. An LCD display 414 provides status information concerning the locator 400 and range and bearing information to a cooperative beacon. The display 414 further provides information as to whether the beacon and locator have used the same set of satellites to calculate the range and bearing information. When the same set of satellites is used to calculate position information at the beacon and locator, any induced S/A errors are canceled out. Thus, the locator will indicate at display 414 that the solution is "Good." When a different set of satellites is used at the beacon and locator, induced errors from both set of satellites will be cumulative. Thus, the locator will indicate at display 414 that the solution is "Bad." It should be understood, however, that a "Bad" solution may still provide sufficient accuracy at long ranges for purposes of locating a cooperative beacon despite induced S/A errors. At short ranges (within tenths of a kilometer), however, the specific satellites used in the position solution affect the accuracy of the relative solution. Thus, it is important for an operator to realize when the locator and cooperative beacon have used different satellites to derive their GPS data.

In fact, the use of random subsets of a satellite constellation from the GPS satellite system does not merely gracefully degrade the accuracy of the remaining satellite position solution. Instead, depending on the satellites chosen, the relative solutions could actually be worse than the 100 meter S/A induced independent GPS solution errors. For that reason, the GPS receivers of the present invention are programmed to improve the probability of selecting the same satellites. The receivers are set to use the "best 4–high 8" solution (which uses the best four satellites while tracking up to eight visible satellites) rather than the "over determined 6" (which might provide a more accurate absolute solution but must use five or six satellites), with the GPS receivers commanded to "3-D manual" (so that the solution does not randomly switch between using three or four satellites) and with slightly higher elevation mask angels than normal for better visibility above the terrain. Using such receivers increases the probability that both the beacon and the locator will see and use the same "correlated" subset of the visible satellites constellation. It should also be noted that helmet mounted GPS antennas would improve constellation visibility and hence would also increase the probability that a correlated set of satellites will be used.

Figure 5:
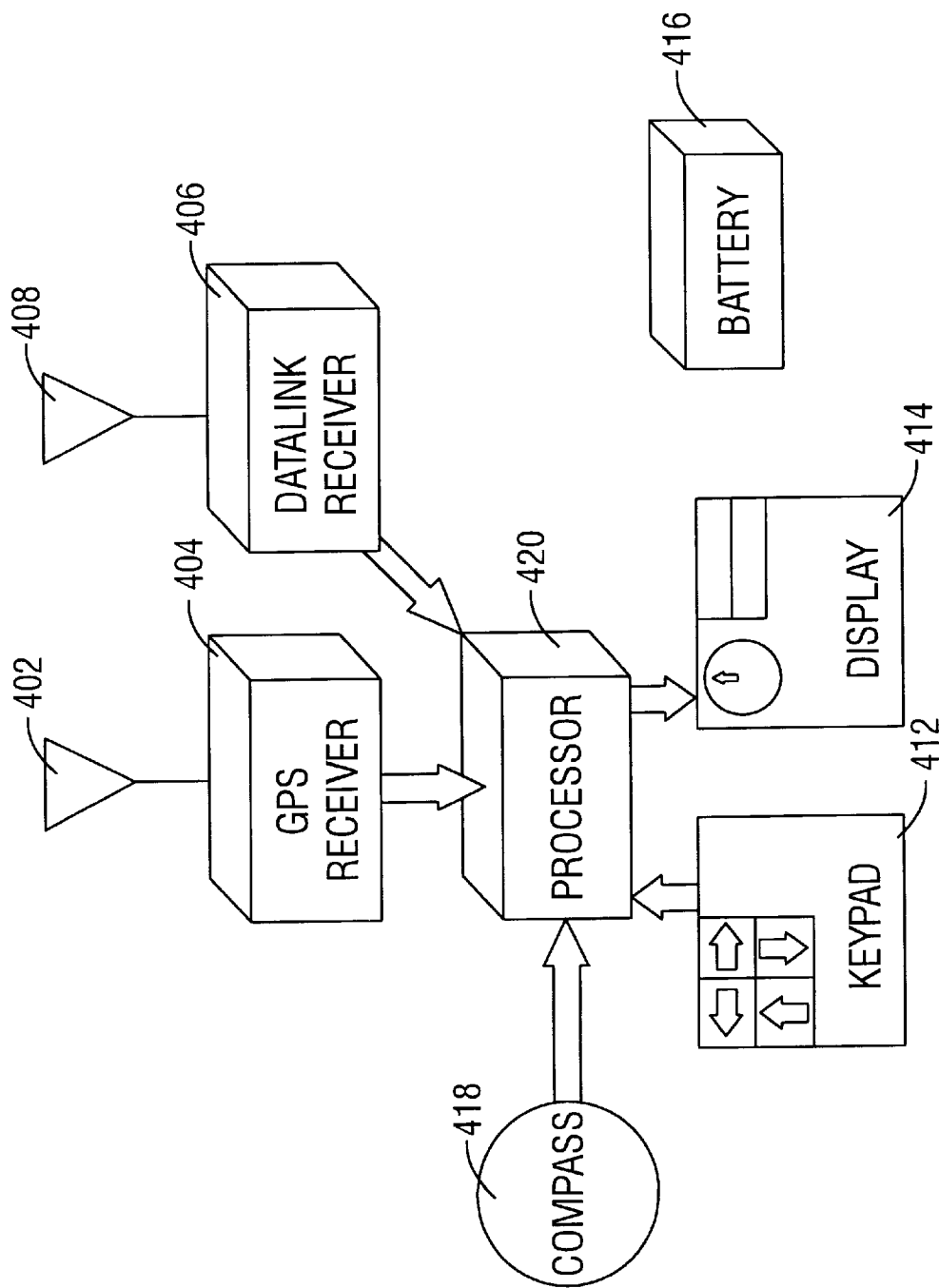
FIG. 5 is a functional diagram of an exemplary locator of the present invention.

FIG. 5 depicts a functional block diagram of an exemplary locator. GPS signals are received at a GPS receiver 404 via an antenna 402. The GPS receiver 404 passes the GPS data to a processor 420. Processor 420 includes a keypad 412 for entry of data and controlling operation of the locator. A display 414 is included to provide status and location information to a user. The processor 420 communicates with a datalink receiver 406, which receives a remote beacon's position and satellite identification data via antenna 408. The locator includes a battery 416 to supply the power to operate the locator. The battery 416 may be a lithium-type battery or any other suitable battery.

The locator further includes a compass 418 for providing a north reference. The reference data is passed on to the processor 420. From this data, the processor 420 can calculate the pointing angle in which an operator located at a locator needs to go in order to reach the beacon. This accurate dual range and bearing presentation permits the operator to assess when and how obstacles can be effectively skirted when attempting to locate a beacon. In an exemplary embodiment, the compass 418 is an electronic compass. However, it should be understood that alternative means for providing a reference direction could be used without departing from the scope of the invention as defined by the claims. By providing a reference direction, the present invention provides an improvement over the prior art locators that required motion to determine bearing information.

Figure 6:
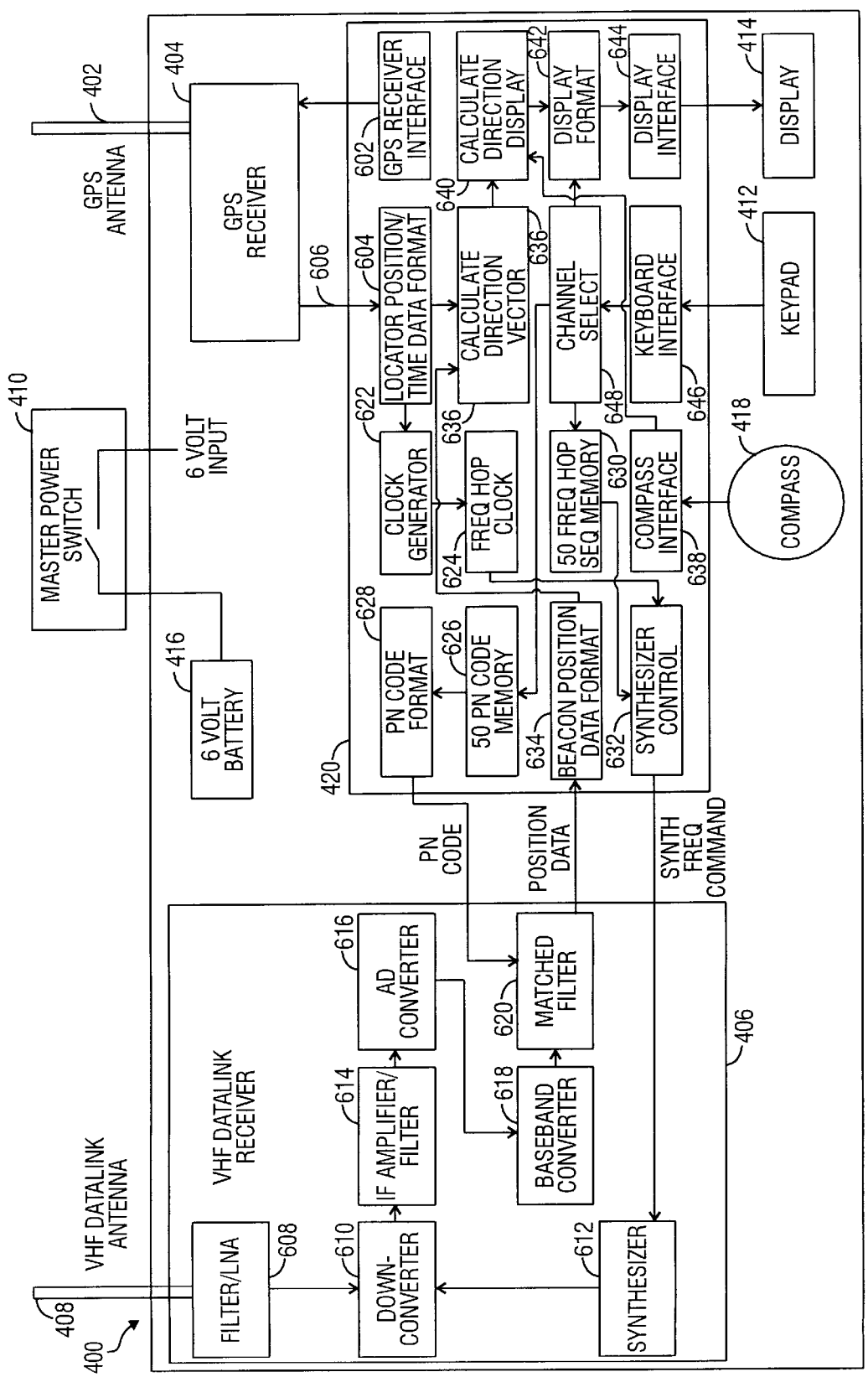
FIG. 6 is a block diagram of an exemplary locator of the present invention.

FIG. 6 is a block diagram of an exemplary locator 400 of the present invention. GPS signals are received at a GPS receiver 404 via an antenna 402. From these GPS signals, the locator derives its GPS data, including its position data and the identification of the satellites used to determine its position. The GPS receiver interfaces to a processor 420 through a GPS receiver interface 602. The GPS receiver 404 provides the processor 420 with its GPS data in ASCII format. The locator position/time data is transferred to the processor 420 by an RS-232 or RS-422 connection 606.

In addition to receiving its own GPS position data, the locator 400 also receives from a beacon 2 data representing the location of the beacon 2. VHF datalink antenna 408 receives the modulated signal and provides the signal to the datalink receiver 406. The datalink receiver 406 filters the modulated signal in filter module 608. The filter module 608 is any standard interference rejection filter. The filter module 608 includes a standard low noise amplifier. The received signal is converted down in frequency by downconverter 610. The synthesizer 612 is a local oscillator operating under control of the processor's synthesizer control 632. The synthesizer 612 provides the downconverter 610 with the frequency corresponding to the channel upon which data should be received.

After downconverting, the signal is passed through an IF amplifier and filter 614. The signal is then converted to a digital representation by an A/D converter 616. The sampled signal is downconverted to the baseband frequency in baseband downconverter 618. The processor provides the corresponding PN code to the datalink 406 for demodulation. The signal is then demodulated using a matched filter 620. The resulting data is transferred to a Beacon Position/Data Format Module 634 of processor 420.

An operator controls operation of the locator 400 through a keypad 412. Commands entered at keypad 412 are provided to the processor 420 through a keyboard interface 646. For example, an operator can enter the channel corresponding to the beacon 2 that the locator is attempting to locate. This information is received by the processor through keyboard interface 646 and passes on to a channel select module 648 of the processor 420. Then, the channel select module 648 selects the corresponding PN code for that channel from 50 PN Code Memory 626. The PN code corresponding to the selected channel is placed in PN code format 628 and provided to the datalink receiver 406. For proper operation, the beacon and locator must be set to the same channel for transmission and reception.

The channel select module 648 may also provide the channel select information to a 50 frequency hopping sequential memory 630. The processor includes a synthesizer control 632 for controlling the frequency synthesizer 612. The synthesizer control 632 receives a signal from the frequency hop clock 624 and the frequency hop memory 630. From these signals the synthesizer control 632 controls the receive frequency of the datalink receiver 406. Once again, the locator must be synchronized with the beacon in order to receive the beacon's transmitted position data during frequency hopping. In order to maintain synchronization during frequency hopping, a clock generator 622 receives time data from GPS receiver 404. Based on this information, the beacon and locator can remain synchronized during frequency hopping.

After demodulation of a signal from a beacon by the datalink receiver 406, the data is provided to beacon position data format module 634 of the processor 420. The data is formatted and transferred to the calculate direction vector module 636. Based on the GPS data from the beacon position data format module 634 and the data received from the locator position/data format module 604, the processor 420 calculates a direction vector that indicates the range and angle between the beacon 2 and locator 400. A compass 418 further provides a north reference through the processor's compass interface 638. The reference data is passed on to the processor's calculate direction display module 640. From this data, the module 640 calculates the pointing angle, relative to north, in which an operator at a locator 400 needs to proceed in order to reach the beacon 2. The result is formatted in display module 642 and displayed on display 414 through the display interface 644. The display format is selected by an operator at the keypad 412.

Power is supplied to the locator by a 6-volt battery 416. Master power switch 410 controls when power is supplied to the locator 400.

Figure 7:
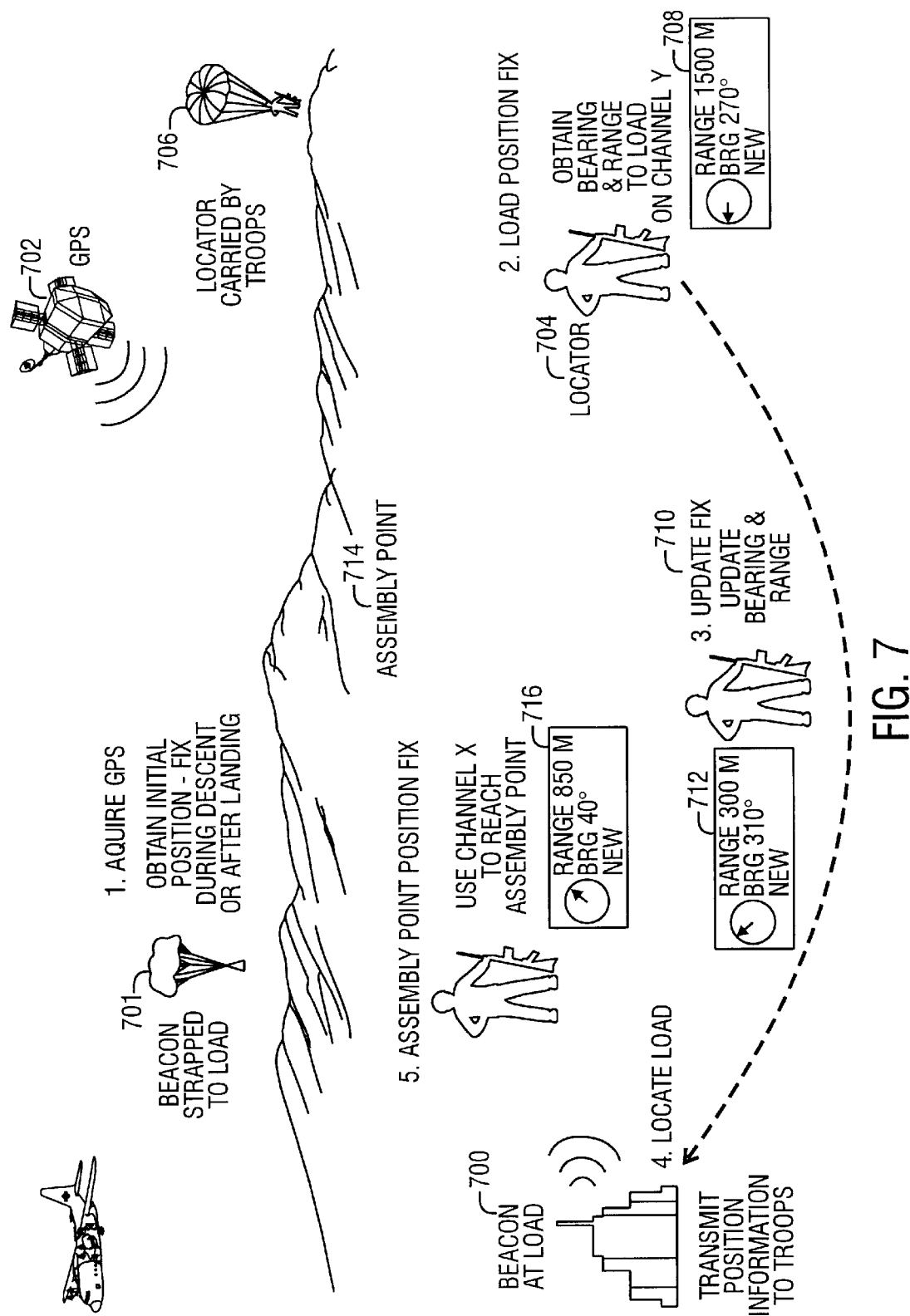
FIG. 7 illustrates the use of the cooperative location system of the present invention.

FIG. 7 illustrates an exemplary application of the cooperative location system of the present invention using one locator and two beacons. It should be understood, however, that the invention is not limited to this specific embodiment. Various combinations of beacons and locators may be used in the system without departing from the spirit and scope of the invention as defined by the claims.

Initially, a beacon 700 is strapped to a load 701 and placed by any of various delivery means such as an airdrop or hand deployment at a first point on the earth. The beacon 700 acquires its initial GPS data based on a signals received from a concentration of GPS satellites 702 during descent or after landing. A locator 704 is carried by an operator 706 and is placed at a second point on the earth. The locator 704 also obtains its initial GPS position data based on signals received from GPS satellites 702. The locator 704 further obtains the initial GPS data from the beacon 700 on a first data transmission channel (shown as channel "Y"). From this data, the locator 704 obtains initial bearing and range data 708. By using an electronic compass, the locator 704 provides a pointing angle to the beacon 700. The bearing and range data may be displayed to the operator using the locator's display 414. From this bearing and range data, the operator can proceed toward the load 701.

After traversing several obstacles on his way to the load 701, the operator 706 arrives at a new location 710. Once at this location, the operator can use the locator 704 to update the bearing and range data to beacon 700. Once again, the locator obtains its own GPS data based on signals received from GPS satellites 702 and the GPS data for the beacon 700 received on the first data transmission channel. From this data, the locator 704 provides the operator with updated bearing and range information 712. After further traversal, the operator reaches the load 701. As can be seen from this example, the present invention does not require the beacon to be stationary during system operation. Thus, the present system provides an advantage over prior location systems that required the beacon to be fixed.

After the load 701 is located, the operator attempts to locate an assembly point 714, which is located at a different point on the earth. Once again, the locator obtains its own GPS data based on signals received from GPS satellite transmissions 702. In addition, it obtains the GPS data for a beacon located at the assembly point 714. The beacon at the assembly point 714 transmits its GPS data to the locator over a different transmission channel than the first beacon 700 in order to prevent interference (shown as channel "X"). The operator must select the channel corresponding to the transmission channel of the beacon located at assembly point 714. As previously discussed, the locator calculates and provides the operator with the new bearing and range information 716. From this information, the operator is able to transverse to the assembly point 714.

In another embodiment of the present invention, the beacon's GPS data is truncated by the beacon in order to reduce the amount of information that must be transmitted to a cooperative locator. The GPS receiver provides position data in the form of X, Y, and Z coordinates measured in meters from the center of the earth. The position data is provided using 9 significant digits (e.g., 4137958.36). The data compression is achieved by truncating all the axes of the beacon's GPS data. For example, to provide a system that is operational within 10,000 meters, the beacon need not transmit the first three digits of the GPS data. In addition, the system may limit its resolution to 1 meter and therefore the last two significant digits may be truncated. Thus, the beacon may truncate the X, Y, and Z data to four digits (e.g., 4137958.36 is truncated to 7958). At the locator, the first three digits can be reconstituted from the locator's own position. Therefore, in this embodiment, less than half the position data actually needs to be transmitted. It should be further understood that the data may be truncated using other range and resolution requirements. For example, for a range of 100,000 meters with a resolution of one hundred meters, only three digits need to be transmitted (e.g., 4137958.36 is truncated to 379). Notably, truncating the data also adds a degree of security since an unauthorized receiver outside the intended range of the device will be unable to properly reconstruct the true location of the beacon.

This truncation method, however, does no work when the most significant digits of the GPS coordinate data are not the same at the locator and the beacon. Therefore, the locator is further operable to detect when the most significant digits are not the same at the locator and the beacon and compensate for this fact. To see how this can be accomplished, consider a one-dimensional example in which the beacon is located at X coordinate 4137958, a locator is positioned 3 km away at X coordinate 4140958, and the system operates with a resolution of 1 meter (i.e. the last two digits of the X coordinate is truncated). Further, let k be an integer that is not less than twice the range of the system in meters. For example, for the present system to have a range of 3 km, k may be selected as equal to 10 km. The beacon decomposes its location X into the sum $X_{base}+X_{scaled}$ where $k>X_{scaled} \geq 0$ and where $X_{base}$ is positive and evenly divisible by k. If k=10 km, then $X_{scaled}$=7958 meters and $X_{base}$=4130000 meters. The beacon encodes and transmits the $X_{scaled}$ figure to the locator.

The locator's position (4140958) is similarly decomposed into the sum $X'_{base}+X'_{scaled}$ where $X'_{base}$=4140000 meters and $X'_{scaled}$=958 meters. To calculate the distance to the beacon, the locator first adds the base position $X'_{base}$ to the received beacon position, which suggests that the beacon is located at 4147958 meters. However, this location cannot be correct since it would suggest that the beacon is 7000 meters (i.e. more than k/2 meters) from the locator. Thus, the actual location of the beacon must be 4137958 meters (k meters less than the first figure) because that figure suggests a distance to the beacon of 3000 meters, which is less than k/2 meters. This one-dimensional example is intended only as a demonstration of the method. It should be understood, however, that the extension of the present example to three dimensions and other resolutions is well within the ordinary skill in the art. An exemplary version of pseudo code for implementing this data truncation for the X coordinate data is provided below. It should be understood, however, that the same algorithm is applied to the Y and Z coordinate data.

```
/************************BEACON***********************/
/* Beacon acquires GPS datum. */
   read_dat(X_beacon);
/* Datum truncated to datum modulo scaler. */
   X_scaled = X_beacon % k;
/*****************************************************
Scaler (k) must be a value larger than twice the designed range of the
system. The significant digits of the system is driven by the designed
operating range.
*****************************************************/
/* Truncated datum X_scaled is encoded and transmitted to Locator. */
   xmit(X_scaled);
/************************LOCATOR**********************/
/* Locator acquires GPS datum. */
   read_dat(X_locator);
/* Locator receives beacon datum. */
```

-continued

```
rcv(X_beacon_in);
/* Locator truncates copy of datum. */
    X_scaled = X_locator % k;
/**************************************************************
Scalar (k) is identical to beacon scaler.
**************************************************************/
/* Locator removes local truncated datum from acquired datum. */
    X_base = X_locator - X_scaled;
/* Locator adds in received Beacon datum. */
    X_beacon = X_base + X_beacon_in;
/* Locator determines delta of data. */
    delta_x = X_locator - X_beacon;
/* If delta_x > k/2 then X_beacon should have been one significant digit
above
or below X_locator */
    If (delta_x > (k/2))
        delta_x = delta_x - (k * (delt_x/|delta_x|));
/* (delta_x/|delta_x|) determines the sign of the error. This compensates for
cases when X_beacon and X_locator have differing significant digits. */
```

Figure 8:
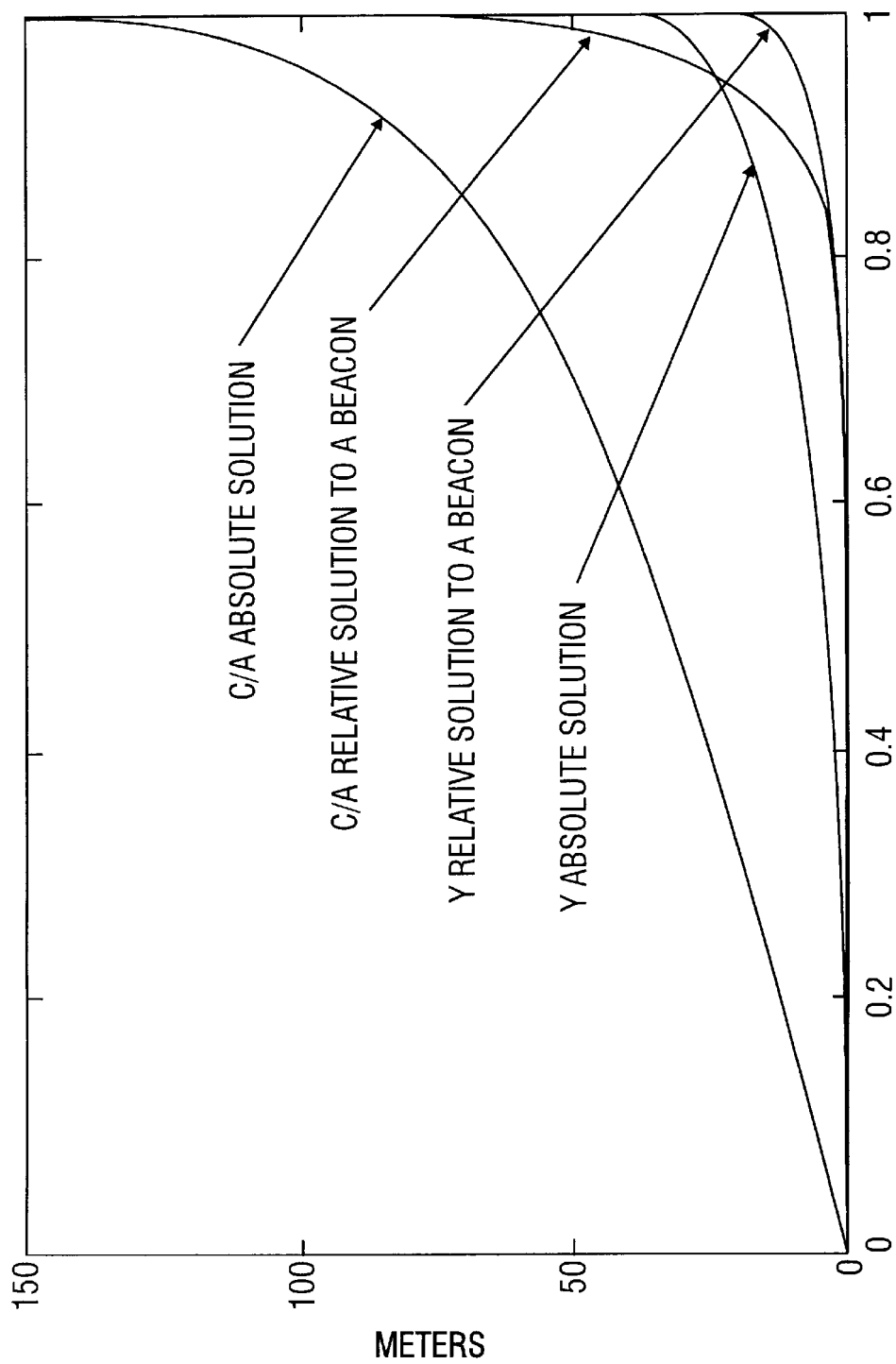
FIG. 8 is a chart of the GPS accuracy for various GPS locator systems, including the relative locator system of the present invention.

FIG. 8 displays a graph of the GPS accuracy for various GPS locator systems, including the relative locator system of an embodiment of the present invention. The y-axis of the graph shows the relative error in meters between a beacon's actual location and the locator's calculated location of the beacon. The x-axis shows the probability that the locator will calculate the location of the beacon within the distance between the beacon'actual location and the locator's calculated location of the beacon. As illustrated in FIG. 8, a locator system using a C/A absolute solution has a high probability that the distance between the actual beacon and the calculated location of the beacon is in error. The Y absolute solution, in which no induced S/A errors are introduced, has a much lower probability of error. Finally, despite S/A induced errors, the C/A relative solution to a beacon of the present invention has a much higher probability that it is accurate than a C/A absolute solution. This accuracy is achieved because both the beacon and locator have the same error introduced when using the same satellites at the beacon and the transmitter to calculate position data. Thus, the error is canceled when the locator determines the direction and range from the locator to the cooperative beacon. Therefore, the present invention provides a significant improvement over prior at systems which require a surveyed base location that transmits the calculated induced S/A random error to the locator.

All of the methods and/or apparatus disclosed and claimed herein can be made and executed without undue experimentation in light of the present disclosure. While the devices and methods of this invention have been described in terms of preferred embodiments, it will be apparent to those of skill in the art that variations may be applied to the methods and/or apparatus and in the steps or in the sequence of steps of the method described herein without departing from the concept, spirit, and scope of the invention. Therefore, all such substitutions and modifications apparent to those skilled in the art are deemed to be within the spirit, scope, and concept of the invention as defined by the appended claims.

What is claimed is:

1. A cooperative location system for use with a Global Positioning System (GPS), which comprises:
    a beacon positioned at a first point on the earth and including
        a first receiver capable of receiving GPS signals and providing a first set of GPS data representing said first point on the earth, wherein said first set of GPS data includes a first set of GPS satellite identification information, wherein said beacon is operable to extract coordinate data from said first set of GPS data to form a first set of GPS coordinate data, and to truncate said first set of GPS coordinate data to form a first set of truncated GPS coordinate data by retraining the least significant digits of said first set of GPS coordinate data that are lower in order than the most significant digit of a specified maximum range of operation around said beacon,
        a transmitter operable to transmit said first set of truncated GPS coordinate data and said first set of GPS satellite identification information;
    a locator positioned at a second point on the earth and including
        a second receiver capable of receiving GPS signals and providing a second set of GPS data representing said second point on the earth, wherein said second set of GPS data includes a second set of GPS satellite identification information,
        a third receiver capable of receiving said first set of GPS data representing said first point on the earth from said transmitter,
        a compass operable to provide a reference direction, and
        a processor operatively coupled to said second and third receivers, capable of calculating range and direction information of said beacon from said first set of truncated GPS coordinate data, said second set of GPS data, and said reference direction,
        wherein said locator is operable to determine whether said locator and said beacon derive said first and second sets of GPS data from an identical set of GPS satellites using said first and second sets of GPS satellite identification information.

2. The cooperative location system of claim 1, wherein said transmitter of said beacon transmits using RF signals.

3. The cooperative location system of claim 2, wherein said transmitter of said beacon transmits using VHF signals.

4. The cooperative location system of claim 1, wherein said first set of truncated GPS coordinate data is formed by retaining the least significant digits of said first set of GPS coordinate data that are lower in order than the most significant digit of twice a specified maximum range of operation around said beacon.

5. The cooperative location system of claim 4, wherein said locator is operable to determine when said first set of truncated GPS coordinate data differs from the digits of said second set of GPS coordinate data that are greater than or equal in order to the most significant digit of twice said specified maximum range of operation around said beacon.

6. The cooperative location system of claim 1, wherein said compass is an electronic compass.

7. The cooperative location system of claim 1, said locator further comprising a high confidence indicator to display when said locator and said beacon derive the first and second set of GPS data from the identical set of GPS satellites.

8. The cooperative location system of claim 1, wherein said beacon is operable to prevent an unauthorized receiver from extracting coordinate data from said first set of truncated GPS coordinate data.

9. A method for determining the location and direction of a beacon located at a first point on the earth, comprising:
    receiving a first set of GPS data representing the first point on the earth;
    receiving a second set of GPS data representing a second point on the earth;
    extracting from said first set of GPS data a first set of GPS coordinate data, and extracting from said second set of GPS data a second set of GPS coordinate data, truncating said first set of GPS coordinate data to form a first set of truncated GPS coordinate data by retaining the least significant digits of said first set of GPS coordinate data that are lower in order than the most significant digit of a specified maximum range of operation around said beacon, determining a reference direction from a compass;

calculating range and direction information of the beacon from said first set of truncated GPS coordinate data, said second set of GPS coordinate data, and said reference direction; and providing an indication as to whether said first and second sets of GPS data are derived from a same set of GPS satellites.

10. The method of claim 9, wherein said first set of truncated GPS coordinate data is formed by retaining the least significant digits of said first set of GPS coordinate data that are lower in order than the most significant digit of twice a specified maximum range of operation of the beacon.

11. The method of claim 10, further comprising determining when the digits of said first set of GPS truncated data differs from the digits of said second set of GPS coordinate data that are greater than or equal in order to the most significant digit of twice said specified maximum range of operation of the beacon.

12. The method of claim 9, further comprising implementing security measures to prevent an unauthorized receiver from calculating range and direction information of the beacon.

13. A locator for use in a cooperative location system comprising:

a first receiver capable of receiving a first set of truncated GPS data representing the position of a cooperative beacon, wherein said first set of truncated GPS data is formed by retaining the least significant digits of a first set of GPS coordinate data that are lower in order than the most significant digit of a specified maximum range of operation around said beacon, a second receiver capable of receiving GPS signals and providing a second set of GPS data representing the position of the locator, a compass for providing a reference direction, a processor operatively coupled to said first and second receivers, capable of calculating range and direction information of said beacon from said first set of truncated GPS data representing the position of said cooperative beacon, said second set of GPS data representing the position of said locator, and said reference direction.

14. A cooperative location system for use with a Global Positioning System (GPS), which comprises:

a beacon positioned at a first point on the earth and including a first receiver capable of receiving GPS signals and providing a first set of GPS data representing said first point on the earth, wherein said beacon is operable to extract coordinate data from said first set of GPS data to form a first set of GPS coordinate data, and to truncate said first set of GPS coordinate data to form a first set of truncated GPS coordinate data by retaining the lest significant digits of said first set of GPS coordinate data that are lower in order than the most significant digit of a specified maximum range of operation around said beacon, and a transmitter operable to transmit said first set of truncated GPS coordinate data;

a locator positioned at a second point on the earth and including a second receiver capable of receiving GPS signals and providing a second set of GPS data representing said second point on the earth, a third receiver capable of receiving said truncated GPS data representing said first point on the earth from said transmitter, a compass operable to provide a reference direction, and a processor operatively coupled to said second and third receivers, capable of calculating range and direction information of said beacon from said first set of truncated GPS coordinate data, said second set of GPS data representing said second point on the earth, and said reference direction.

15. The cooperative location system of claim 14, wherein said beacon is operable to prevent an unauthorized receiver from extracting coordinate data from said first set of truncated GPS coordinate data.

16. A cooperative location system for use with a Global Positioning System (GPS), which comprises:

a beacon positioned at a first point on the earth and including a first receiver capable of receiving GPS signals and providing a first set of GPS data representing said first point on the earth, wherein said first set of GPS data includes a first set of GPS satellite identification information, wherein said beacon is operable to extract coordinate data from said first set of GPS data to form a first set of GPS coordinate data, and to truncate said first set of GPS coordinate data to form a first set of truncated GPS coordinate data, wherein said first set of truncated GPS coordinate data is formed by retaining the least significant digits of said firs set of GPS coordinate data that are lower in order than the most significant digit of twice a specified maximum range of operation around said beacon, a transmitter operable to transmit said first set of truncated GPS coordinate data and said first set of GPS satellite identification information;

a locator positioned at a second point on the earth and including a second receiver capable of receiving GPS signals and providing a second set of GPS data representing said second point on the earth, wherein said second set of GPS data includes a second set of GPS satellite identification information, a third receiver capable of receiving said first set of GPS data representing said first point on the earth from said transmitter, a compass operable to provide a reference direction, and a processor operatively coupled to said second and third receivers, capable of calculating range and direction information of said beacon from said first set of truncated GPS coordinate data, said second set of GPS data representing said second point on the earth, and said reference direction, wherein said locator is operable to determine whether said locator and said beacon derive said first and second sets of GPS data from an identical set of GPS satellites using said first and second sets of GPS satellite identification information.

17. The cooperative location system of claim 16, wherein said locator is operable to determine when said first set of truncated GPS coordinate data differs from the digits of said second set of GPS coordinate data that are greater than or equal in order to the most significant digit of twice said specified maximum range of operation around said beacon.

18. A method for determining the location and direction of a beacon located at a first point on the earth, comprising:

receiving a first set of GPS data representing the first point on the earth;

receiving a second set of GPS data representing a second point on the earth;

extracting from said first set of GPS data a first set of GPS coordinate data, and extracting from said second set of GPS data a second set of GPS coordinate data, truncating said first set of GPS coordinate data to form a fist set of truncated GPS coordinate data by retaining the least significant digits of said first set of GPS coordinate data that are lower in order than the most significant digit of twice a specified maximum range of operation of the beacon, determining a reference direction from a compass;

calculating range and direction information of the beacon from said first set of truncated GPS coordinate data, said second set of GPS coordinate data, and said reference direction; and providing an indication as to whether said first and second sets of GPS data are derived from a same set of GPS satellites.

19. The method of claim 18, further comprising determining when the digits of said first set of GPS truncated data differs from the digits of said second set of GPS coordinate data that are greater than or equal in order to the most significant digit of twice said specified maximum range of operation of the beacon.

* * * * *

UNITED STATES PATENT AND TRADEMARK OFFICE
CERTIFICATE OF CORRECTION

PATENT NO. : 6,043,777
DATED : March 28, 2000
INVENTOR(S) : Julian J. Bergman, Scott W. Kennett, John D. Roths, and Karl L. Thorup It is certified that error appears in the above-identified patent and that said Letters Patent is hereby corrected as shown below:

Claim 1, column 12, line 6, delete "retraining" and insert -- retaining-- therefor.

Claim 14, column 13, line 61, delete "lest" and insert -- least -- therefor.

Claim 18, column 15, line 16, delete "fist" and insert -- first -- therefor.

Signed and Sealed this

Sixth Day of March, 2001

*Attest:*

NICHOLAS P. GODICI

*Attesting Officer*   *Acting Director of the United States Patent and Trademark Office*